US012589345B2

(12) United States Patent
Tindel et al.

(10) Patent No.: US 12,589,345 B2
(45) Date of Patent: Mar. 31, 2026

(54) FILTER ISOLATION FOR REDUCED STARTUP TIME IN LOW RELATIVE HUMIDITY EQUIPMENT FRONT END MODULE

(71) Applicant: Applied Materials, Inc., Santa Clara, CA (US)

(72) Inventors: Steven Trey Tindel, Austin, TX (US); Paul B. Reuter, Austin, TX (US)

(73) Assignee: Applied Materials, Inc., Santa Clara, CA (US)

( * ) Notice: Subject to any disclaimer, the term of this patent is extended or adjusted under 35 U.S.C. 154(b) by 603 days.

(21) Appl. No.: 17/716,927

(22) Filed: Apr. 8, 2022

(65) Prior Publication Data

US 2023/0321583 A1    Oct. 12, 2023

(51) Int. Cl.
*B01D 46/42* (2006.01)
*B01D 46/00* (2022.01)

(52) U.S. Cl.
CPC ......... *B01D 46/42* (2013.01); *B01D 46/0002* (2013.01); *B01D 2271/02* (2013.01)

(58) Field of Classification Search
CPC ............... B01D 46/42; B01D 46/0002; B01D 2271/02; H01L 21/67772; H01L 21/67389; H01L 21/67207; F24F 3/167; F24F 2009/002; F24F 9/00; H05K 3/0055
USPC .......................................................... 95/217
See application file for complete search history.

(56) References Cited

U.S. PATENT DOCUMENTS

| | | | | |
|---|---|---|---|---|
| 2004/0103628 A1* | 6/2004 | Kim | ................... | B01D 46/0002 55/482 |
| 2015/0276069 A1* | 10/2015 | Saragosa | .................. | G01N 1/22 251/304 |
| 2016/0147235 A1* | 5/2016 | Rice | ....................... | G05B 15/02 700/282 |
| 2017/0213752 A1* | 7/2017 | Ogawa | .............. | H01L 21/67386 |
| 2018/0040493 A1* | 2/2018 | Kawai | .................... | B01D 53/40 |
| 2020/0135499 A1 | 4/2020 | Pannese et al. | | |
| 2020/0135520 A1 | 4/2020 | Reuter et al. | | |
| 2020/0135521 A1* | 4/2020 | Reuter | .............. | H01L 21/67393 |
| 2020/0135525 A1 | 4/2020 | Reuter et al. | | |
| 2020/0243354 A1* | 7/2020 | Wirth | .................... | F27D 5/0037 |
| 2021/0235583 A1* | 7/2021 | Yang | ................. | H01L 21/67389 |

FOREIGN PATENT DOCUMENTS

CN          102449752 A  *  5/2012  ....... H01L 21/67772

* cited by examiner

*Primary Examiner* — Claire X Wang
*Assistant Examiner* — Qianping He
(74) *Attorney, Agent, or Firm* — Lowenstein Sandler LLP

(57) ABSTRACT

Disclosed herein are systems and methods for reducing startup time of an equipment front end module (EFEM). The EFEM may include an EFEM chamber formed between a plurality of walls, an upper plenum at a top of the EFEM, the upper plenum in fluid communication with the EFEM chamber, a plurality of ducts that provide a return gas flow path enabling recirculation of gas from the EFEM chamber to the upper plenum, one or more filters in fluid communication with the upper plenum and the EFEM chamber and at least one isolation component configured to removably attach to the EFEM to isolate at least the one or more filters from an ambient environment when the EFEM is opened to the ambient environment.

10 Claims, 6 Drawing Sheets

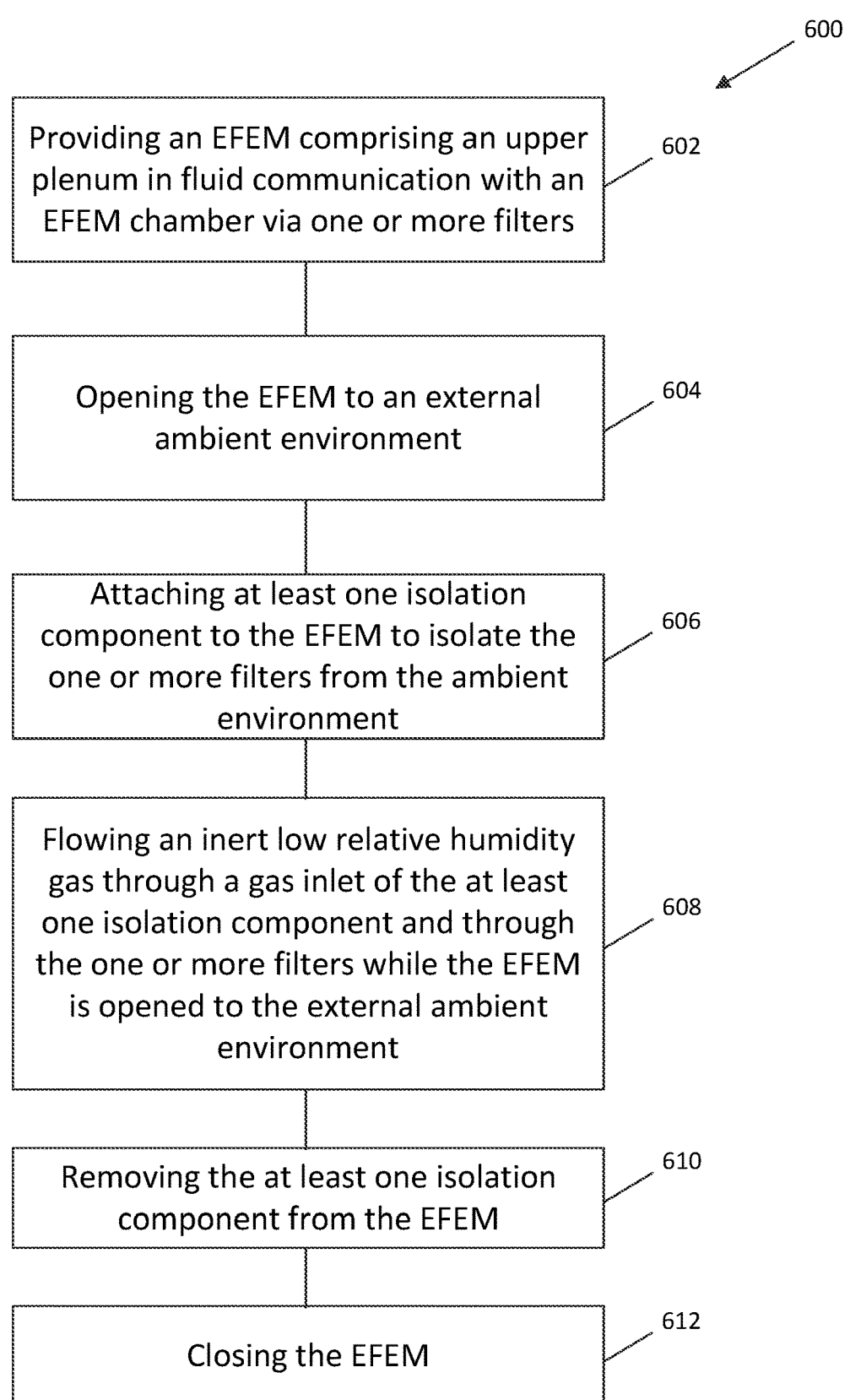

600

Providing an EFEM comprising an upper plenum in fluid communication with an EFEM chamber via one or more filters — 602

Opening the EFEM to an external ambient environment — 604

Attaching at least one isolation component to the EFEM to isolate the one or more filters from the ambient environment — 606

Flowing an inert low relative humidity gas through a gas inlet of the at least one isolation component and through the one or more filters while the EFEM is opened to the external ambient environment — 608

Removing the at least one isolation component from the EFEM — 610

Closing the EFEM — 612

FIG. 6

FILTER ISOLATION FOR REDUCED STARTUP TIME IN LOW RELATIVE HUMIDITY EQUIPMENT FRONT END MODULE

FIELD

The present disclosure relates to electronic device manufacturing, and more specifically to equipment front end modules (EFEMs).

BACKGROUND

Processing substrates in semiconductor electronic device manufacturing is generally carried out in multiple process tools, where substrates travel between process tools in substrate carriers. A substrate carrier may be docked at a load port of an equipment front end module (EFEM), sometimes referred to as a factory interface (FI), where one or more substrates are transferred to a load lock, a transfer chamber and/or a process chamber. Pre- and post-substrate exposure to moisture and oxygen can cause on substrate corrosion (e.g., etch), interlayer defects (e.g., film stress and resistivity, physical vapor deposition) and device non-uniformity (e.g., chemical vapor deposition passivation). Eliminating moisture and oxygen from the EFEM environment reduces and/or eliminates such device performance and yield challenges.

Some EFEMs provide a non-reactive environment for transferring substrates between the substrate carriers and the load lock and/or chamber. This is achieved by sealing the interior volume of the EFEM as much as is practical and flooding the interior volume with a gas such as nitrogen that is generally non-reactive with substrate materials. The non-reactive gas forces out any reactive gases such as oxygen from the EFEM and also reduces/eliminates moisture from the EFEM. One or more load ports for docking to one or more substrate carriers may be arranged along a front face of the EFEM. The load ports of conventional EFEMs are bottom purged with an inert gas to reduce the relative humidity (RH) and oxygen levels within the substrate carrier and EFEM during substrate processing and transport.

When EFEMs are opened to an ambient environment, such as during maintenance of the EFEM, the interior of the EFEM is exposed to the ambient environment. The ambient environment generally has a relative humidity that may be 30-40 times greater than the relative humidity under which the EFEM generally operates. EFEMs may include filters that absorb moisture from the ambient environment the EFEMs are open to the ambient environment. Once maintenance of the EFEM is completed and it is closed back up, a requalification process is generally performed before the EFEM can be returned to service. Due to the filters of the EFEM having absorbed moisture while the interior of the EFEM was exposed to the ambient environment, the requalification process can take over 24 hours, during which the moisture absorbed by the filters is slowly removed. Such long requalification processes can be costly to owners, as product is not processed until the requalification process is complete.

BRIEF SUMMARY

Disclosed herein according to one or more embodiments, is a system, comprising an equipment front end module (EFEM), comprising an EFEM chamber formed between a plurality of walls of the EFEM; an upper plenum above the EFEM chamber, the upper plenum in fluid communication with the EFEM chamber; a plurality of ducts that provide a return gas flow path enabling recirculation of gas from the EFEM chamber to the upper plenum; and one or more filters that separate the upper plenum from the EFEM chamber; and at least one isolation component configured to removably attach to the EFEM, wherein while attached to the EFEM the isolation component isolates at least the one or more filters from an ambient environment when the EFEM is opened to the ambient environment.

A method of servicing an equipment front end module (EFEM), comprising providing the EFEM comprising an upper plenum in fluid communication with an EFEM chamber via one or more filters; opening the EFEM to an external ambient environment, wherein the EFEM comprises an EFEM chamber, an upper plenum above the EFEM chamber, and one or more filters that separates the upper plenum from the EFEM chamber; attaching at least one isolation component to the EFEM to isolate the one or more filters from the ambient environment; flowing a gas through a gas inlet of the at least one isolation component and through the one or more filters while the EFEM is opened to the external ambient environment, preventing moisture from the ambient environment from being absorbed by the one or more filters; removing the at least one isolation component from the EFEM when the EFEM is ready to be closed; and closing the EFEM.

A removable isolation panel for an equipment front end module (EFEM), comprising a rectangular body having dimensions that approximately correspond to dimensions of one or more filters of the EFEM that the removable isolation panel is configured to be inserted into during maintenance of the EFEM; a gas inlet in the rectangular body, the gas inlet configured to couple to a gas line while the removable isolation panel is inserted into the EFEM; one or more handles coupled to the rectangular body, the one or more handles configured to facilitate carrying of the isolation panel and positioning of the isolation panel into the EFEM; and a gasket at a peripheral edge of the rectangular body, the gasket configured to seal the isolation panel against a surface of an upper plenum of the EFEM or an EFEM chamber of the EFEM; wherein the removable isolation panel is configured to flow a gas through the gas inlet towards one or more filter of the EFEM while the EFEM is open to an ambient environment to prevent the one or more filter from absorbing moisture of the ambient environment.

BRIEF DESCRIPTION OF THE DRAWINGS

The drawings, described below, are for illustrative purposes and are not necessarily drawn to scale. The drawings are not intended to limit the scope of the disclosure in any way.

FIG. 6 illustrates a method of using an EFEM with isolation components according to one or more embodiments described herein.

DETAILED DESCRIPTION

Figure 1:
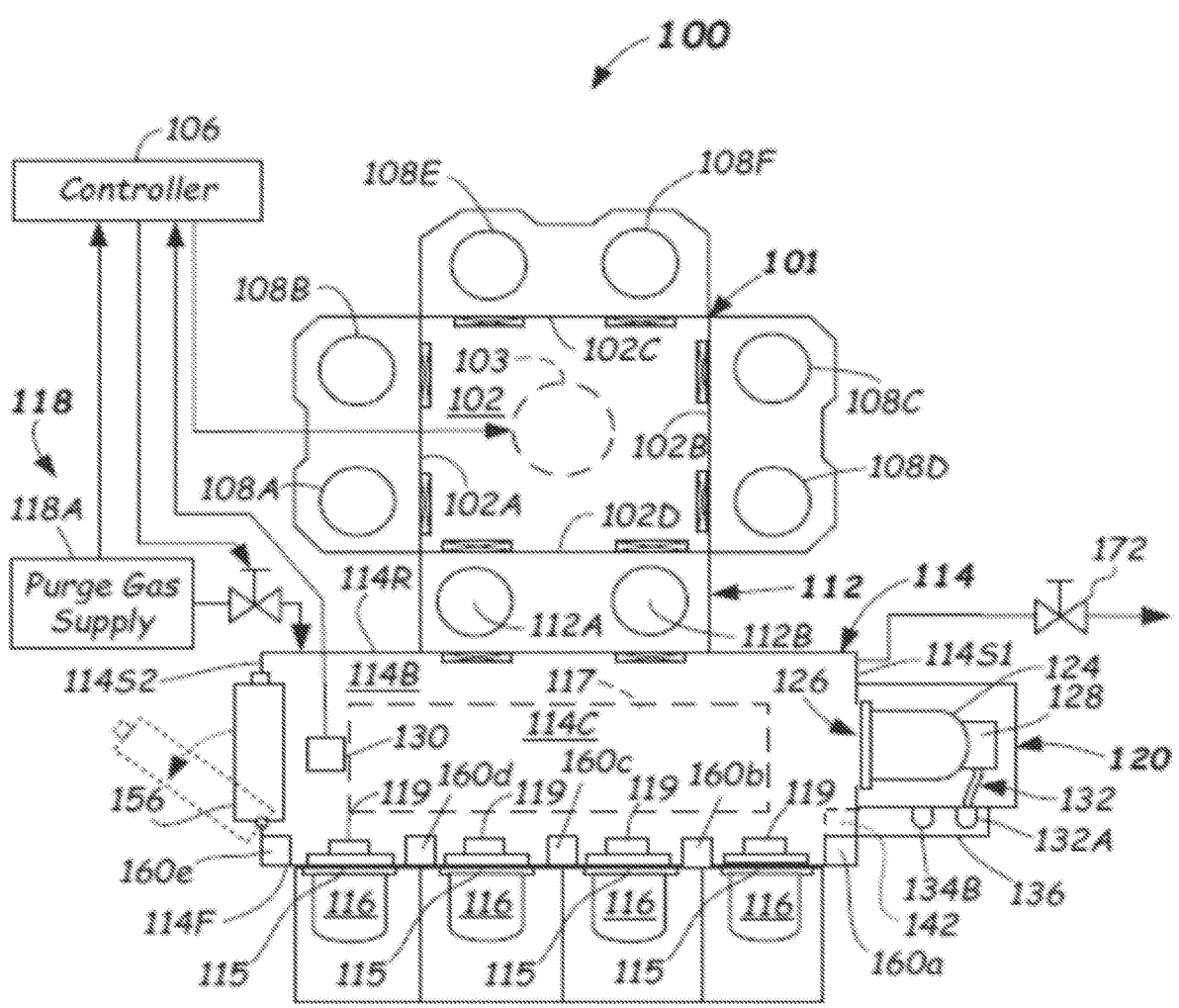
FIG. 1 illustrates a schematic top view of an electronic device manufacturing assembly according to one or more embodiments of the disclosure.

Reference will now be made in detail to the example embodiments of this disclosure, which are illustrated in the accompanying drawings. Wherever possible, the same reference numbers will be used throughout the drawings to refer to the same or like parts throughout the several views. Features of the various embodiments described herein may be combined with each other, unless specifically noted otherwise.

Described herein are embodiments of an EFEM that is configured to isolate one or more filters of the EFEM from an ambient environment during servicing of the EFEM to reduce startup time after such servicing. During servicing of the EFEM, the EFEM may be opened up and an interior of the EFEM may be exposed to a relatively high humidity ambient environment. In particular, during service and/or startup of the EFEM, one or more filters within the EFEM may be exposed to relatively high relative humidity (RH) ambient gas (e.g., ambient air). The humidity is present in the ambient environment, and adheres to all surfaces exposed to the ambient environment. In particular, moisture from the ambient environment can adsorb onto the filter media such that when the EFEM begins operation (which may include circulating a low RH inert gas through the interior of the EFEM), the system can take a substantial amount of time to reach target RH levels (e.g., such as 24 hours or more). Before the EFEM is ready to operate on product, the adsorbed moisture should first be desorbed from all surfaces, including from the filters. As a result, the time that it takes to return the EFEM to low humidity levels used for operations of product depends on the amount of time its internal components were exposed to relatively high humidity of an ambient environment such as during a startup or maintenance recovery. Isolation of the one or more filters in an EFEM from an ambient environment while the EFEM is open to the ambient environment creates an effective way to keep the filter media of the EFEM dry and unexposed to higher ambient RH levels of the ambient environment. This can be accomplished by attaching isolation components (e.g., isolation panels) to the filter compartment in embodiments, which seal one side of the media therein from the ambient environment, and flowing a purge gas (e.g., a low humidity gas such as low RH xCDA) through an inlet in the isolation component and toward the filter media. This creates a positive flow of purge gas through the filter media while the interior of the EFEM is open to the ambient environment, preventing or reducing moisture from the ambient from contacting the filter media.

Known recirculating EFEM's do not have the ability to isolate the filter media to keep it dry when open to an ambient environment having relative high RH. For example, if the EFEM is being serviced, the filter will be exposed to the ambient air within a semiconductor fabrication plant. Typically, this ambient air has an RH of about 25% to about 50%, or about 30% to about 40%, or about 38%. During this service, the filters are exposed to that same high level of humidity, whereas before (in the case of a service) the filters may be operating at below about 1% RH, which may be the operational target. The EFEM doors may be opened during maintenance to enable access to the interior components of the EFEM. A service could be performed for a short amount of time (e.g., about 30 minutes), or may be performed for a long amount of time (e.g., about 8 to about 10 hours). The longer the filters are exposed to the higher RH level of the ambient air, the higher the moisture content adsorbed onto the filter media, and thus the longer it takes to reduce the RH level within the EFEM once it is sealed back up.

EFEMs according to one or more embodiments herein, include a removable isolation component that isolates the one or more filters of the EFEMs from an ambient environment and maintains a flow of inert gas through one or more filters of the EFEM while the EFEM is open to the ambient environment. The isolation component may be sealed against one side of a filter assembly while the EFEM is open, and may be removed from the EFEM when the EFEM is ready to be closed. This can greatly reduce an amount of humidity absorbed or adsorbed by the one or more filters of the EFEM while the EFEM is open to the ambient environment. Accordingly, such systems and equipment provide for a faster startup and return to a low operational level of RH suitable for substrate processing than conventional EFEMs. EFEM's, according to one or more embodiments herein, return the RH of the inert gas to a baseline operational level as quickly as possible, and much more quickly than standard EFEMs that do not use a removable isolation component during maintenance. Ambient room air has a relatively high RH as compared to target RH levels during operation of the EFEM. When the one or more filters within the EFEM remain exposed to ambient air, moisture permeates the media and increases the time it takes to dry them out during startup. Filter media is inherently a large absorber of moisture. Keeping the filter media dry can greatly reduce startup time of the EFEM.

EFEMs, according to one or more embodiments herein, may include one or more filter isolation components (e.g., isolation panels). The filter isolation components may be configured to enclose the one or more filters within a sequestered environment. Isolating the one or more filters and filter media can reduce moisture permeation in EFEM that control relative humidity (RH) of inert gas to low levels. The inert, low RH gas may recirculate through the EFEM and its flow transformation ducts in some embodiments. Suitable inert, low RH gases include, but are not limited to, nitrogen ($N_2$), clean dry air (CDA), extreme clean dry air (xCDA), that is, CDA having a moisture content of less than about 0.33 ppm by weight, and so on.

FIG. 1 illustrates a schematic diagram of an example embodiment of an electronic device manufacturing assembly 100 according to one or more embodiments of the present disclosure. The electronic device manufacturing assembly 100 may include a mainframe housing 101 having housing walls defining a transfer chamber 102. A transfer robot 103 (shown as a dotted circle) may be at least partially housed within the transfer chamber 102. The transfer robot 103 may be configured to place and remove substrates to and from various destinations via operation of arms (not shown) of the transfer robot 103. "Substrates" as used herein may refer to articles used to make electronic devices or circuit components, such as semiconductor wafers, silicon-containing wafers, patterned wafers, glass plates, and the like.

The motion of the various arm components of the transfer robot 103 may be controlled by suitable commands to a drive assembly (not shown) containing a plurality of drive motors of the transfer robot 103 as commanded from a controller 106. Signals from the controller 106 may cause motion of the various components of the transfer robot 103. Suitable feedback mechanisms may be provided for one or more of the components by various sensors, such as position encoders, and the like.

The transfer chamber 102 as shown is square, but could be rectangular, hexagonal, octagonal, or another polygonal shape and may include a first wall 102A, second wall 102B, a third wall 102C, and a fourth wall 102D. In the embodiment shown, the transfer robot 103 can transfer and/or retract dual substrates at the same time. The first wall 102A, second wall 102B, third wall 102C, and fourth wall 102D may be planar and entryways into the sets of process chambers may lie along the respective walls. However, other suitable shapes of the mainframe housing 101, numbers of walls and process chambers, and types of robots are possible.

The destinations for the transfer robot 103 may be any one or more of the process chambers 108A-108F, which may be configured and operable to carry out a process on the substrates delivered thereto. The process may be any suitable process such as plasma vapor deposition (PVD) or chemical vapor deposition (CVD), etch, annealing, pre-clean, metal or metal oxide removal, and the like. Other processes may be carried out on substrates therein.

Substrates may be received into the transfer chamber 102 from an EFEM 114, and may exit the transfer chamber 102 to the EFEM 114, through a load lock apparatus 112, which is coupled to a rear wall 114R of the EFEM 114. The load lock apparatus 112 may include one or more load lock chambers (e.g., load lock chambers 112A and 112B) therein. Load lock chambers 112A and 112B may be single wafer load lock (SWLL) chambers, multi-wafer chambers, or combinations thereof. Other numbers of load locks may be included.

The EFEM 114 may be an enclosure having various enclosure walls, such as, e.g., front wall 114F, rear wall 114R, two side walls 114S1, 114S2, a top (not shown), and a bottom 114B, forming an EFEM chamber 114C. Each of the front 114F, rear 114R, and two side walls 114S1, 114S2 may have one or more interface openings to facilitate substrate exchange and/or coupling to other components. One or more load ports 115 may be provided on the front wall (not shown) of the EFEM 114 as shown in FIG. 1. The one or more load ports 115 may each be configured to receive and dock with a respective one or more substrate carrier 116 (e.g., FOUP). Although four load ports 115 and four substrate carriers 116 are shown, other embodiments may have more or fewer load ports 115 suitable for docking a respective number of substrate carriers 116 at the EFEM 114.

EFEM 114 may include a suitable load/unload robot 117 (shown dotted) of conventional construction within the EFEM chamber 114C thereof. The load/unload robot 117 may be configured and operational, once a carrier door of a substrate carrier 116 is opened via a carrier door opener 119 for each of the load ports 115, to extract substrates from the substrate carrier 116 and to feed the substrates through the EFEM chamber 114C and into the one or more load lock chambers 112A and 112B of the load lock apparatus 112.

Side storage pod 120 may be coupled to a sidewall 114S1 of the EFEM 114. In particular, the load/unload robot 117 may further be configured to extract substrates from and load substrates into the side storage pod 120 prior to and/or after processing in one or more of the process chambers 108A-108F. In some embodiments, the load/unload robot

117 is a high-Z robot configured to access substrates stacked 26 high, or even 52 high or higher, in the side storage pod 120.

In the embodiment shown, the EFEM chamber 114C may be provided with environmental controls providing an environmentally-controlled atmosphere therein. In particular, an environmental control apparatus 118 may be coupled to the EFEM 114 and may be operational to monitor and/or control environmental conditions within the EFEM chamber 114C. In some embodiments, and at certain times, the EFEM chamber 114C may receive a purge gas (e.g., an inert and/or non-reactive gas) therein, such as, e.g., argon (Ar), nitrogen ($N_2$), helium (He), clean dry air, or extreme clean dry air (xCDA) from purge gas supply 118A. The purge gas supply 118A may be coupled by suitable conduits and one or more valves to the EFEM chamber 114C. The environmental conditions within the EFEM chamber 114C may be within the interiors of side storage containers 124 located within and as part of the side storage pod 120. The side storage containers 124 receive substrates vertically stacked therein. In some embodiments, the side storage pod 120 may have substrate holders located therein to receive and support substrates.

In more detail, the environmental control system 118 may control at least one of: 1) relative humidity (RH), 2) temperature (T), 3) an amount of oxygen ($O_2$), and/or 4) an amount of purge gas, within the EFEM chamber 114C. Other environmental conditions of the EFEM 114 may be monitored and/or controlled, such as gas flow rate into the EFEM chamber 114C, or pressure within the EFEM chamber 114C, or both.

In some embodiments, environmental control system 118 includes controller 106. Controller 106 may include suitable processor, memory, and electronic components for receiving inputs from various sensors and for controlling one or more valves to control the environmental conditions within the EFEM chamber 114C. Environmental control system 118 may, in one or more embodiments, monitor relative humidity (RH) by sensing RH in the EFEM 114 with a sensor 130. Any suitable type of sensor that measures relative humidity may be used, such as a capacitive-type sensor. The RH may be lowered by flowing a suitable amount of purge gas from the purge gas supply 118A of the environmental control system 118 into the EFEM chamber 114C. In some embodiments, compressed bulk inert gases having low $H_2O$ levels (e.g., purity ≥99.9995%, $H_2O$≤5 ppm) may be used as the purge gas supply 118A in the environmental control system 118, for example. Other suitably low $H_2O$ levels may be used.

In another aspect, the sensor 130 may measure a plurality of environmental conditions. For example, in some embodiments, the sensor 130 may measure the relative humidity value as discussed above. In one or more embodiments, the pre-defined reference relative humidity value may be less than 1000 ppm moisture, less than 500 ppm moisture, or even less than 100 ppm moisture, depending upon the level of moisture that is tolerable for the particular process being carried out in the electronic device manufacturing assembly 100 or particular substrates exposed to the environment of the EFEM 114.

The sensor 130 may also measure a level of oxygen ($O_2$) within the EFEM 114. In some embodiments, a control signal from the controller 106 to the environmental control apparatus 118 initiating a flow of a suitable amount of purge gas from the purge gas supply 118A into the EFEM chamber 114C may take place to control the level of oxygen ($O_2$) to below a threshold $O_2$ value. In one or more embodiments, the threshold $O_2$ value may be less than 50 ppm, less than 10 ppm, or even less than 5 ppm, depending upon the level of $O_2$ that is tolerable (not affecting quality) for the particular process being carried out in the electronic device manufacturing assembly 100 or particular substrates exposed to the environment of the EFEM 114. In some embodiments, the sensor 130 may sense the level of oxygen in the EFEM chamber 114C to ensure it is above a safe threshold level to allow entry into the EFEM chamber 114C.

The sensor 130 may further measure the absolute or relative pressure within the EFEM 114. In some embodiments, the controller 106 may control the amount of flow of purge gas from the purge gas supply 118A into the EFEM chamber 114C to control the pressure in the EFEM chamber 114C.

In the embodiments shown herein, the controller 106 may include a processor, memory, and peripheral components configured to receive control inputs (e.g., relative humidity and/or oxygen) from the sensor 130 and to execute a closed loop or other suitable control scheme. In one embodiment, the control scheme may change a flow rate of the purge gas being introduced into the EFEM 114 to achieve a predetermined environmental condition therein. In another embodiment, the control scheme may determine when to transfer substrates into the EFEM 114 or when to open the door of the substrate carrier 116.

The side storage pod 120 attached to the EFEM 114 may store substrates under specific environmental conditions. For example, the side storage pod 120 may store the substrates in the same environmental conditions as are present in the EFEM chamber 114C, except the gas flow rate in the side storage pod 120 may be different, such as significantly greater. The side storage pod 120 may be fluidly coupled to the EFEM chamber 114C and may receive gas (e.g., purge gas) from the EFEM chamber 114C. The side storage pod 120 may include exhaust conduits 132 that exhaust gas from the side storage pod 120, which further enables the substrates stored in the side storage pod 120 to be constantly exposed to the desired environmental conditions and purge gas flow rate.

In some embodiments, the side storage pod 120 may receive one or more vertically-aligned side storage containers 124). For example, a first side storage container 124 may be received in the side storage pod 120. The first side storage container 124 may include an opening 126 that faces the EFEM chamber 114C. The first side storage container 124 may also include an exhaust plenum 128 located opposite the opening 126. The exhaust plenum 128 may be coupled to an exhaust conduit 132 that may couple between the exhaust plenum 128 and an exterior of the side storage pod 120.

The first exhaust conduit 132 may be made up of an internal portion and a first external portion 132A. A second conduit may be coupled between a second side storage container and may include a second external portion 134B. Both the first external portion 134A and the second external portion 134B may be located within a cover 136. In some embodiments, the cover 136, rather than the first external portion 134A and the second external portion 134B, may function as a conduit to exhaust the exhausted gas from the side storage containers 124 and 224. In other embodiments, the first external portion 134A and the second external portion 134B may pass through the interior of the side storage pod 120.

Figure 2:
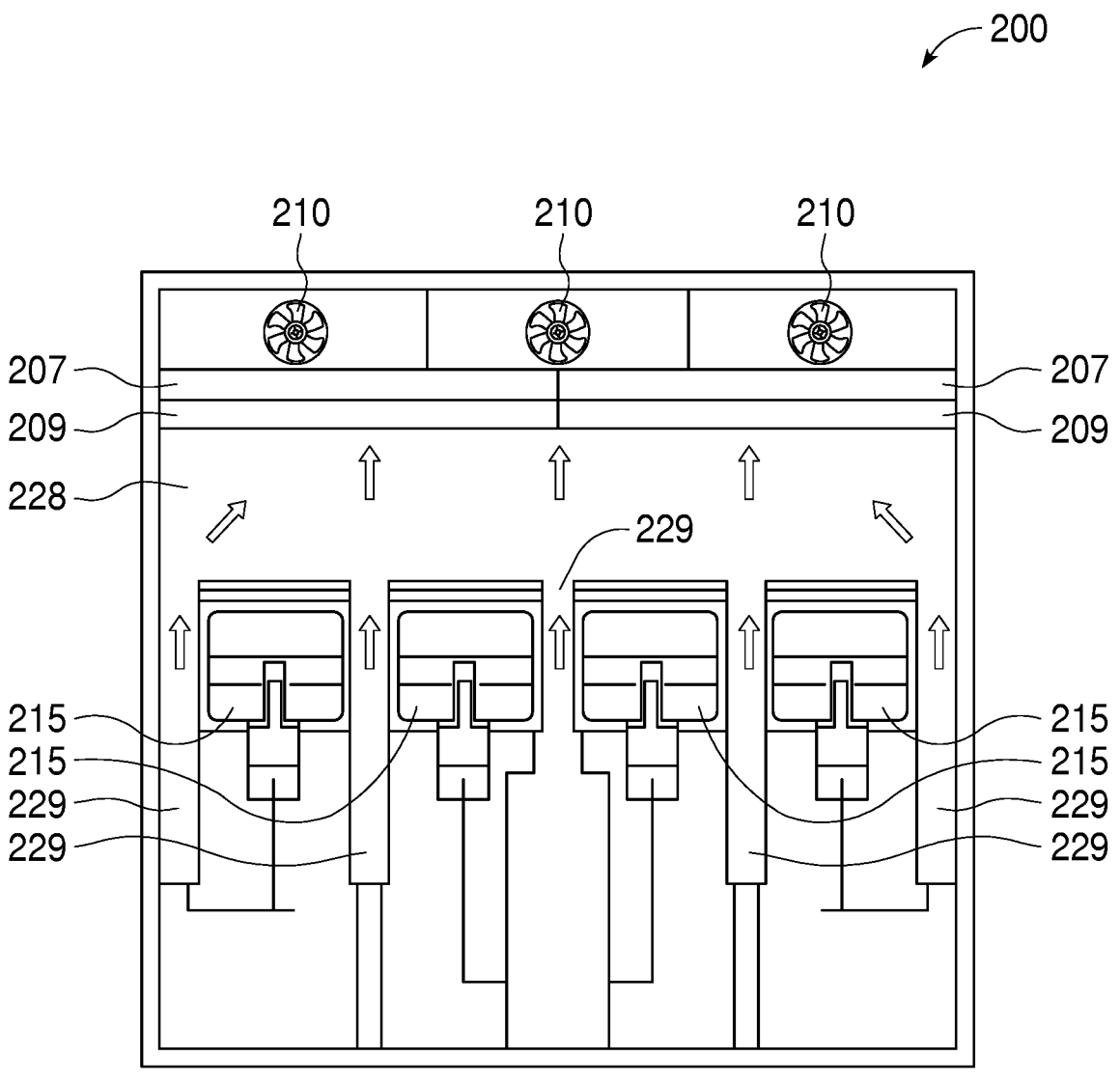
FIG. 2 illustrates a schematic front view of an EFEM according to one or more embodiments of the disclosure.
Figure 3:
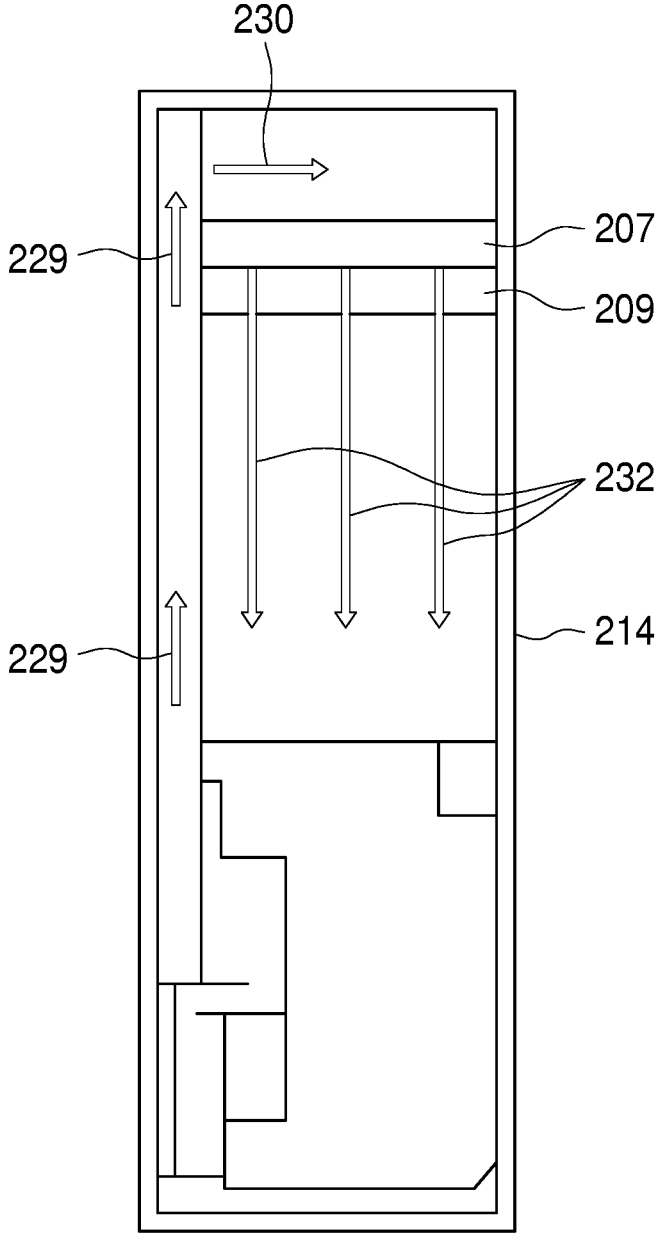
FIG. 3 illustrates a schematic side view of an EFEM according to one or more embodiments of the disclosure.

FIG. 2 illustrates a schematic front view of an electronic device manufacturing assembly according to one or more embodiments of the disclosure. FIG. 3 illustrates a schematic side view of an electronic device manufacturing assembly according to one or more embodiments of the disclosure.

An embodiment of an EFEM system suitable for use with isolation components according to embodiments herein is shown in FIGS. 2 and 3. As with EFEM 114, substrates may be received into a transfer chamber (not shown) from EFEM 200, and may exit the transfer chamber to the EFEM 200, through a load lock apparatus (not shown), which is coupled to a wall of EFEM 200. The load lock apparatus may include one or more load lock chambers therein. Load lock chambers may be single wafer load lock (SWLL) chambers, multi-wafer chambers, or combinations thereof.

EFEM 200 may be an enclosure having various enclosure walls, such as, e.g., a front wall, a rear wall, two side walls, a top, and a bottom, forming an EFEM chamber 214. Each of the front, rear, and two side walls may have one or more interface openings to facilitate substrate exchange and/or coupling to other components. One or more load ports 215 may be provided on a wall of EFEM 200 as shown in FIG. 2. The one or more load ports 215 may each be configured to receive and dock with a respective one or more substrate carrier (e.g., a FOUP). Although four load ports 215 are shown, other embodiments may have more or fewer load ports 215 suitable for docking a respective number of substrate carriers at the EFEM 200.

In the embodiment shown, the EFEM chamber 214 may be provided with environmental controls providing an environmentally-controlled atmosphere therein. In particular, an environmental control apparatus (not shown) may be coupled to the EFEM 200 and may be operational to monitor and/or control environmental conditions within the EFEM chamber 214. In some embodiments, the EFEM chamber 214 may receive a purge gas (e.g., an inert and/or non-reactive gas) therein, such as, e.g., argon (Ar), nitrogen ($N_2$), helium (He), clean dry air, or extreme clean dry air (xCDA) from purge gas supply. The environmental control system may control at least one of: 1) relative humidity (RH), 2) temperature (T), 3) an amount of oxygen ($O_2$), and/or 4) an amount of purge gas, within the EFEM chamber 214. Other environmental conditions of the EFEM 200 may be monitored and/or controlled, such as gas flow rate into the EFEM chamber 214, or pressure within the EFEM chamber 214, or both.

In some embodiments, environmental control system includes a controller (not shown). The controller may include a suitable processor, memory, and electronic components for receiving inputs from various sensors and for controlling one or more valves to control the environmental conditions within the EFEM chamber 214. The environmental control system may, in one or more embodiments, monitor relative humidity (RH) by sensing RH in the EFEM 214 with a sensor. Any suitable type of sensor that measures relative humidity may be used, such as a capacitive-type sensor. The RH may be lowered by flowing a suitable amount of purge gas from the purge gas supply of the environmental control system into the EFEM chamber 214. In some embodiments, compressed bulk inert gases having low $H_2O$ levels (e.g., purity ≥99.9995%, $H_2O$≤5 ppm) may be used as the purge gas supply in the environmental control system. Other suitably low $H_2O$ levels may be used.

In another aspect, the sensor may measure a plurality of environmental conditions. For example, in some embodiments, the sensor may measure the relative humidity value as discussed above. In one or more embodiments, the pre-defined reference relative humidity value may be less than 1000 ppm moisture, less than 500 ppm moisture, or even less than 100 ppm moisture, depending upon the level of moisture that is tolerable for the particular process being carried out in the electronic device manufacturing assembly 100 or particular substrates exposed to the environment of the EFEM 214.

The environmental control system may also measure a level of oxygen ($O_2$) within the EFEM 214. In some embodiments, a control signal from the controller to the environmental control apparatus initiating a flow of a suitable amount of purge gas from the purge gas supply into the EFEM chamber 214 may take place to control the level of oxygen ($O_2$) to below a threshold $O_2$ value. In one or more embodiments, the threshold $O_2$ value may be less than 50 ppm, less than 10 ppm, or even less than 5 ppm, depending upon the level of $O_2$ that is tolerable (not affecting quality) for the particular process being carried out in the electronic device manufacturing assembly 100 or particular substrates exposed to the environment of the EFEM 200. In some embodiments, the sensor may sense the level of oxygen in the EFEM chamber 214 to ensure it is above a safe threshold level to allow entry into the EFEM chamber 214.

The sensor may further measure the absolute or relative pressure within the EFEM 200. In some embodiments, the controller may control the amount of flow of purge gas from the purge gas supply into the EFEM chamber 214 to control the pressure in the EFEM chamber 214.

The controller may include a processor, memory, and peripheral components configured to receive control inputs (e.g., relative humidity and/or oxygen) from the sensor and to execute a closed loop or other suitable control scheme. In one embodiment, the control scheme may change a flow rate of the purge gas being introduced into the EFEM 200 to achieve a predetermined environmental condition therein. In another embodiment, the control scheme may determine when to transfer substrates into the EFEM 200 or when to open the door of the substrate carrier.

Chemical and particle filters 207, 209, respectively, within EFEM 200 can be isolated with an isolation component 408 (FIGS. 4A-4C) anywhere within the recirculation ducting 228, 229. As shown in FIG. 2, gas may flow through the ducting toward the filter media using one or more fan systems 210. In some embodiments, the filters may be isolated in the return path 229 to maintain dry filter media. A gas inlet 418 (FIGS. 4A-4C) may be configured to receive a low RH inert purge gas to displace ambient air with high RH gas during a service event or installation. In some embodiments, the purge gas may be recirculated during the service to reduce consumables as will be described in more detail with respect to FIGS. 4A-4C. As shown in FIG. 3, gas may flow up through ducting 228, 229. The gas may enter a plenum 230 above chemical and particle filters 207, 209. The fan units may then force the gas through filters 207, 209 so that it flows down 232 into the EFEM chamber 214.

The EFEM chamber and/or upper plenum of the EFEM may include doors or panels that can be opened up or removed to provide access to an interior of the EFEM chamber and/or upper plenum. The EFEM may undergo periodic maintenance, during which the EFEM chamber and/or upper plenum may be exposed to an ambient environment. In embodiments, the EFEM is configured to receive a removable isolation component (e.g., isolation panel) while the upper plenum and/or EFEM chamber are open to an ambient environment.

Figures 4A, 4B, 4C:
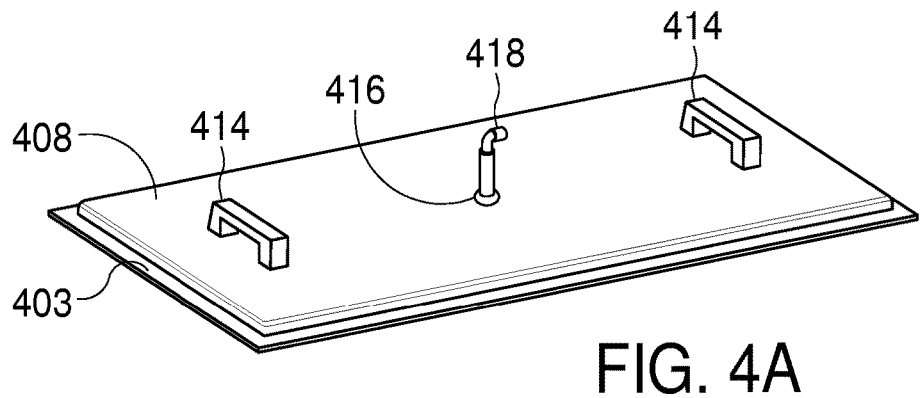
FIG. 4A is a schematic showing an EFEM environment together with fan units, one or more filters and isolation components according to one or more embodiments of the disclosure.
FIG. 4B is a perspective view of an isolation component according to one or more embodiments of the disclosure.
FIG. 4C is a perspective view of a plurality of isolation components attached to an EFEM according to one or more embodiments of the disclosure.

FIG. 4A is a perspective view of an isolation component 408 according to one or more embodiments of the disclosure. Isolation component 408 can include a body and handles 414 coupled to a surface of the body, which enable the isolation component 408 to be removably attached to the EFEM to isolate the filters and EFEM environment therein. The handles may facilitate carrying of the isolation component 408 and positioning of the isolation component 408 against a surface of an upper plenum, EFEM chamber and/or filter assembly. Isolation component 408 may include an inert gas inlet 416 to connect the isolation component 408 to a fan unit compartment (not shown) of the EFEM (which may include one or more filters) and to a low RH inert purge gas. The low RH inert gas is to maintain a target pressure and flow through the filters during a service or startup, to keep any ambient relative humidity from permeating these filters from the bottom side or the top side of the filters. Sealing the isolation component 408 against one side or surface of a filter assembly (e.g., against a bottom surface of an upper plenum or a top surface of an EFEM chamber and driving the low RH inert gas through the one or more filters away from the isolation component 408 keeps the media dry during a service and/or startup by preventing the ambient air from contacting the filter(s).

According to various embodiments, the filters within the EFEM system can be isolated anywhere within the recirculation ducting 228. In some embodiments, the filters may be isolated in the return path 229 to maintain dry filter media. Isolation component 408 may include a gas inlet 418 configured to receive a low RH inert purge gas to displace ambient air with high RH gas during a service event or installation. In some embodiments, the purge gas may be recirculated during the service to reduce consumables. For example, two isolation components may be used, where one is sealed against a bottom surface of the upper plenum and another is sealed against a top surface of the EFEM chamber. Purge gas may be flowed from a first isolation component of the isolation components, through the filters, and toward a second isolation component of the isolation components. The second isolation component may be coupled to a recirculation duct that may recirculate the purge gas back through the gas inlet of the first isolation component, reducing an amount of purge gas that is used during servicing of the EFEM. In one embodiment, two isolation components are used, where one seals to a bottom surface of the upper plenum and the other seals against a top surface of the EFEM chamber. In such an embodiment, the isolation components may not include gas inlets or outlets, and may instead seal the filter from two sides while the EFEM is serviced.

A body of isolation component 408 may be constructed of a suitable metal or polymer material. Suitable metals include, but are not limited to, stainless steel, 316L stainless steel, powder coated stainless steel, aluminum, carbon steel, chromium and combinations thereof. Suitable polymers include, but are not limited to, polypropylene, polycarbonate, perfluoroalkoxy (PFA), polyvinylchloride (PVC), high density polyethylene (HDPE), low density polyethylene (LDPE), polyvinylidene fluoride (PVDF), partially fluorinated semi-crystalline polymer (e.g., Halar®) and fire retardant/clean room grade polymers (e.g., FM 4910 rated) and combinations thereof. In some embodiments, the isolation component 408 is surrounded by a gasket (not shown) disposed around an outer edge 403 thereof. The gasket may be a closed cell foam rubber material, for example, an ethylene propylene diene monomer closed cell foam rubber. In some embodiments, the gasket is a bulb gasket. The gasket is resistant to moisture permeation to provide isolation of the filters. For example, the isolation component may be seated on the moisture resistant gasket and clamped, bolted or otherwise suitably attached onto a frame surrounding one or more filter compartments. In some embodiments, the isolation components may further include a desiccant, for example, within the isolated environment or external to the isolated environment proximate any seals and/or connections. Suitable desiccants include, but are not limited to, silica gels, clay, molecular sieves and combinations thereof.

FIG. 4B is a perspective view of a plurality of isolation components 408A, 408B engaged within an upper plenum of an EFEM according to one or more embodiments of the disclosure. Isolation of the particle and chemical filters 407A, 409, 222A can include isolation components 408, 408A, 408B directly adjacent to one (or both) sides of the filter compartment. The isolation components 408, 408A, 408B may include a gas inlet 416, 416A, 416B through which a low RH gas is flowed to force the low RH gas (e.g., xCDA) through the filter media. This inhibits the ability of ambient moisture from adhering or infiltrating the filter media. As would be appreciated by those of ordinary skill in the art, components other than panels as shown in FIGS. 4A-4C can be used to isolate any paths in the ducting that permits flow through the filter media.

In some embodiments, the EFEM includes a plurality of filters, for example, a stack of a chemical filter and a particle filter. Each filter may be contained within a filter compartment (or housing) 407A, 409. Isolation component 408A may be attached to the one or more filter compartments (or housing) 407A, 407B, 409 to isolate any filters and filter media therein from the external ambient environment. In some embodiments, such as shown with respect to isolation component 408B, the isolation component 408B may be attached to a single filter compartment 407B. In one or more embodiments, isolation components 408A, 408B include gas inlets 416A, 416B configured to receive a pressurized low RH purge gas 417 from, for example, a gas supply or the fan units within the EFEM. Although shown with the purge gas 417 flowing downward through the isolation components 408A, 408B, the system and panels may be configured to flow the purge gas 417 upward instead. In such an instance, the isolation components may be attached to a top inner surface of the EFEM chamber rather than to a bottom inner surface of the upper plenum (as shown). The isolation components may be any suitable thickness, for example, about 1 mm to about 5 cm, or about 10 mm to about 2 cm, or about 50 mm to about 1 cm, or any individual value or sub-range within these ranges.

FIG. 4C is a perspective view of a plurality of isolation components engaged in an EFEM 400 to according to one or more embodiments of the disclosure. In some embodiments, the EFEM includes a plurality of filters, for example, a stack of a chemical filter and a particle filter, each filter contained within a filter compartment 407A, 409. Isolation component 408A may be attached to the one or more filter compartments 407A, 409 to isolate any filters and filter media within the filter compartments 407A, 409 from the external ambient environment. In some embodiments, such as shown with respect to isolation component 408B, the isolation component 408B may be attached to a single filter compartment 407B. In one or more embodiments, isolation components 408A, 408B include connectors 416A, 416B configured to attach isolation components 408A, 408B to fan unit compartments (not shown) of the EFEM. As shown, the isolation components may be inserted within the upper plenum and sealed against a bottom surface of the upper plenum, to seal the isolation components against the top of the filter compartment.

Figure 5:
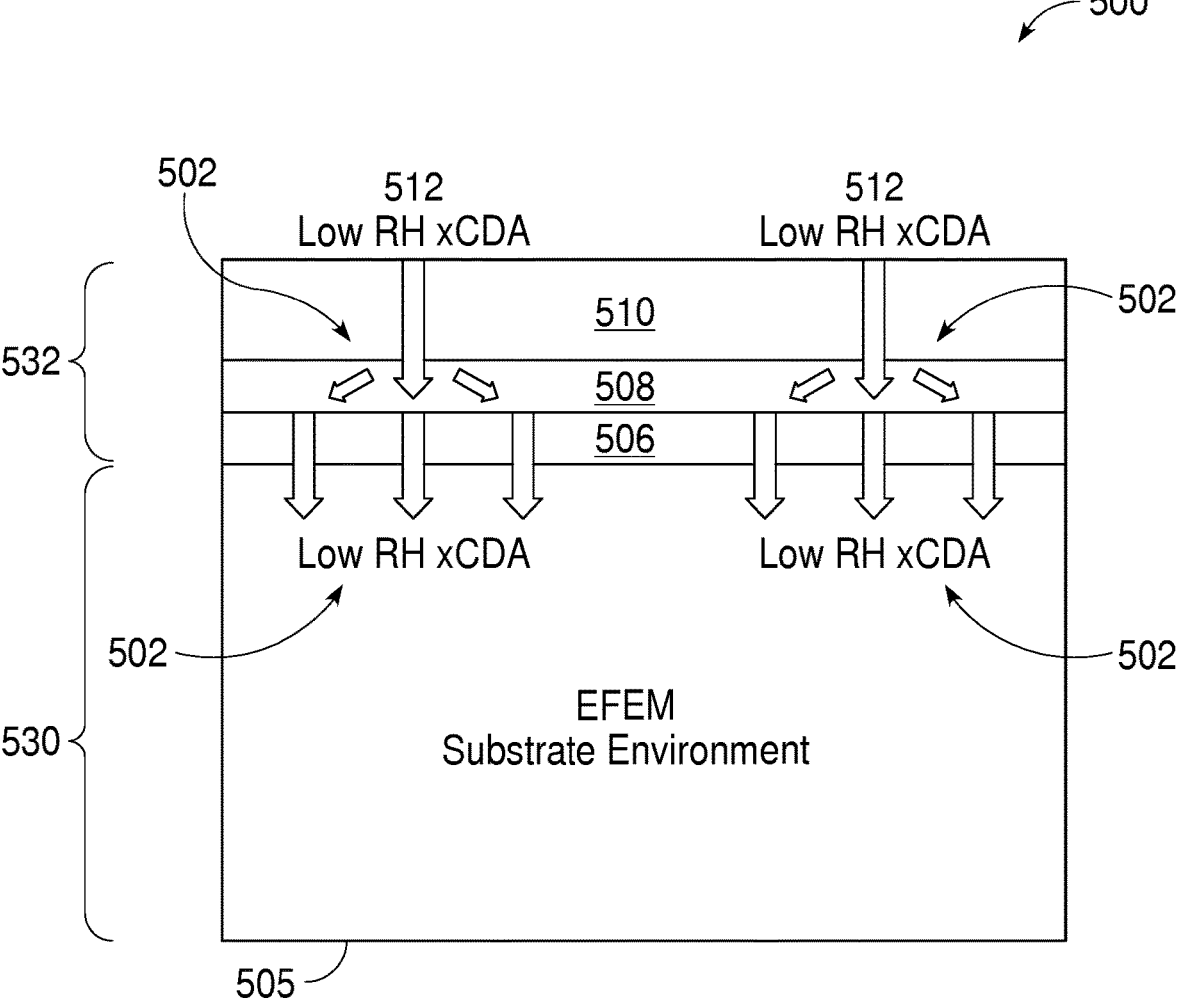
FIG. 5 is a schematic view showing an interior of an EFEM, where the EFEM chamber and upper plenum have both been opened to an ambient environment.

FIG. 5 is a schematic showing an interior of an EFEM 500, where the EFEM chamber 530 and upper plenum 532 have both been opened to an ambient environment. As shown, a filter compartment containing one or more filter 506 separates the EFEM chamber 530 from the upper plenum 532. The upper plenum includes one or more fan units 510. One or more isolation components 508 are inserted into the upper plenum and attached to a bottom interior surface of the upper plenum 532. A gasket around a perimeter of the isolation component 508 seals the isolation component against the one or more filter 506, in accordance with various embodiments of the disclosure. The schematic illustrates an EFEM 500 during, for example, a service event (or initial startup). Generally, when an EFEM is opened to an external environment, ambient gas 502 (e.g., air with a relative humidity of about 25% to about 45%, about 30% to about 40%, or about 38%) at a higher RH than the inert gas used for operation within the EFEM environment 504, can permeate the one or more filters 506 from the top and bottom. The target RH for the inert gas circulating within the EFEM during operation is less than about 10%, less than about 5% or less than about 1%. This permeation of ambient air or relatively high RH gas consequently can raise the moisture content of the filter media within the filters 506. In accordance with at least one embodiment herein, one or more isolation components 508 may be incorporated into the EFEM 500 to isolate and protect the filters 506 from the external environment containing the ambient gas 502 during servicing. The isolation component 508 can then be removed after servicing is complete.

During a service event or initial startup, the one or more isolation components 508 (e.g., a pair of isolation panels) may be engaged to isolate the filters 506 from the external ambient gas 502. During isolation, a low RH inert gas (e.g., xCDA, $N_2$, etc.) 512 may be introduced into the one or more filters 506 and EFEM environment 504 from an inert gas supply through one or more gas inlets of the isolation component(s) 508. As shown, even though the upper plenum 532 and EFEM chamber 530 are exposed to an ambient environment, the top of the filters 506 is isolated from the ambient environment by the isolation component(s) 508. Additionally, the isolation components may drive a purge gas 512 through the filters 506 away from the isolation components 508 (e.g., in a downward direction in one embodiment as shown). This may create a positive pressure below the filters 506. As a result, ambient air may be pushed away from the filters 506 by the flowing purge gas and prevent the bottom of the filters 506 from being exposed to the ambient air even though the bottom of the filters 506 is open to the ambient air.

The configuration shown in FIG. 5 can reduce startup time of the EFEM 500 by at least about 50%, at least about 60%, at least about 70%, at least about 80%, at least about 90%, at least about 95% or at least about 99%. For example, the startup time after maintenance may be reduced to below 7 hours. In some embodiments, EFEM 500 can reduce startup time by about 50% to about 99%, about 60% to about 95%, about 70% to about 90%, or any individual value or sub-range within these ranges.

FIG. 6 illustrates a method 600 of servicing an EFEM using isolation components according to one or more embodiments described herein. At block 602, the method includes providing an EFEM. The EFEM may include inter alia an upper plenum in fluid communication with an EFEM chamber via one or more filters. In one or more embodiments, the EFEM is taken offline to perform a service event or is offline for an initial installation and/or startup.

At block 604, embodiments of method 600 include opening the EFEM to an external ambient environment. For example, a door to the EFEM may be opened exposing the internal components to the ambient environment. The ambient environment typically contains air at a relative humidity higher than the target RH for operation within the EFEM.

At block 606, method 600 includes attaching at least one isolation component to the EFEM to isolate the one or more filters from the ambient environment. According to one or more embodiments, the one or more isolation components are promptly installed in the EFEM to sequester the one or more filters of the EFEM from the external ambient environment.

At block 608, method 600 includes flowing a low RH purge gas through a gas inlet of the at least one isolation component and through the one or more filters while the EFEM is opened to the external ambient environment. The low RH purge gas may be connected to the one or more isolation components and is pressurized to provide a positive flow rate of purge gas through the one or more filters. While the internal components of the EFEM are being accessed, the purge gas flows through the filter media preventing moisture from the ambient environment from being absorbed by the one or more filters. The purge gas flow continues until completion of the service work. The low RH inert gas may be the same as the low RH inter gas used during operation of the EFEM or it may be a different gas at a different RH that is lower than the RH of the ambient environment.

At block 610, method 600 includes removing the at least one isolation component from the EFEM when the EFEM is ready to be closed. For example, the isolation component may be clamped onto the EFEM structure and/or also may contain handles. The clamps may be released and the isolation component lifted off from the EFEM structure. Upon removal of the at least one isolation component, the EFEM doors are promptly closed to once again close the internal components of the EFEM from the external ambient environment.

At block 612, method 600 includes closing the EFEM. Once the EFEM is closed, it is started up to return to its target operating conditions. Having isolated the one or more filters from the high RH ambient environment, the EFEM can become operational again in less than about 7 hours, less than about 6 hours, less than about 5 hours, less than about 4 hours, less than about 3 hours, or any individual value or sub-range within these ranges.

A comparison of system service events at baseline was performed with respect to equipment using filter isolation according to one or more embodiments herein. In one example, the EFEM system was opened and exposed to ambient humidity for predetermined time intervals and the time to return to operating control mode levels was measured. In a second example, the filters were isolated according to at least one embodiment herein and the system was exposed to ambient humidity for the same predetermined time intervals. The time to return to operating control mode levels was measured.

Systems and methods as described herein substantially reduced the startup time for the EFEM as compared to convention EFEMs. For example, if the door to a conventional EFEM is opened to expose the internal components and filter media to external air at an RH of about 30% to about 40% for about 30 minutes, the time it would take to restart the EFEM and bring down the RH of the gas to a target of less than about 1% would be about 8 hours to about 12 hours, or about 8.5 hours to about 10 hours or any individual value or sub-range within these ranges. In contrast, an EFEM and associated methods of use according to one or more embodiments described herein, wherein the filters are isolated during a 30 minute service and purged with a low RH gas, the time it would take to restart the EFEM and bring down the RH of the gas to a target of less than about 1% would be about 3 hours to about 7 hours, or about 4 hours to about 6 hours, or 6 hours, or any individual value or sub-range within these ranges. In some embodiments, an EFEM and associated methods according to embodiments herein reduce the time it takes to restart the EFEM after a services by about 12.5% to about 75%, about 15% to about 62.5%, about 25% to about 50%, or any individual value or sub-range within these ranges. In some embodiments, if the service is two hours, then the restart of the inventive EFEM as compared to a conventional EFEM is about 40% faster. Reducing startup time by about half, for example, can bring production systems back online more quickly, which can increase revenue and reduce costs.

Reference throughout this specification to, for example, "one embodiment," "certain embodiments," "one or more embodiments" or "an embodiment" means that a particular feature, structure, material, or characteristic described in connection with the embodiment is included in at least one embodiment of the invention. Thus, the appearances of the phrases such as "in one or more embodiments," "in certain embodiments," "in one embodiment" or "in an embodiment" in various places throughout this specification are not necessarily referring to the same embodiment of the invention. Furthermore, the particular features, structures, materials, or characteristics may be combined in any suitable manner in one or more embodiments.

As used herein, the singular forms "a," "an," and "the" include plural references unless the context clearly indicates otherwise. Thus, for example, reference to "a robot arm" includes a single robot arm as well as more than one robot arm.

As used herein, the term "about" in connection with a measured quantity, refers to the normal variations in that measured quantity as expected by one of ordinary skill in the art in making the measurement and exercising a level of care commensurate with the objective of measurement and the precision of the measuring equipment. In certain embodiments, the term "about" includes the recited number±10%, such that "about 10" would include from 9 to 11.

The term "at least about" in connection with a measured quantity refers to the normal variations in the measured quantity, as expected by one of ordinary skill in the art in making the measurement and exercising a level of care commensurate with the objective of measurement and precisions of the measuring equipment and any quantities higher than that. In certain embodiments, the term "at least about" includes the recited number minus 10% and any quantity that is higher such that "at least about 10" would include 9 and anything greater than 9. This term can also be expressed as "about 10 or more." Similarly, the term "less than about" typically includes the recited number plus 10% and any quantity that is lower such that "less than about 10" would include 11 and anything less than 11. This term can also be expressed as "about 10 or less."

Unless otherwise indicated, all parts and percentages are by weight. Weight percent (wt. %), if not otherwise indicated, is based on an entire composition free of any volatiles, that is, based on dry solids content.

The foregoing description discloses example embodiments of the disclosure. Modifications of the above-disclosed assemblies, apparatus, and methods which fall within the scope of the disclosure will be readily apparent to those of ordinary skill in the art. Accordingly, while the present disclosure has been disclosed in connection with example embodiments, it should be understood that other embodiments may fall within the scope of the disclosure, as defined by the following claims.

What is claimed is:

1. A system, comprising:

an equipment front end module (EFEM), comprising:

an EFEM chamber formed between a plurality of walls of the EFEM;

an upper plenum above the EFEM chamber, the upper plenum in fluid communication with the EFEM chamber;

a plurality of ducts that provide a return gas flow path enabling recirculation of gas from the EFEM chamber to the upper plenum; and one or more filters that separate the upper plenum from the EFEM chamber; and a plurality of isolation components configured to entirely removably attach to the EFEM, wherein, while attached to the EFEM, the plurality of isolation components isolate at least the one or more filters from an external ambient environment outside of the EFEM when the EFEM is opened to the external ambient environment, and wherein a first isolation component of the plurality of isolation components is disposed within the upper plenum and sealed against a bottom surface of the upper plenum, wherein the plurality of isolation components each comprises a gas inlet which can be configured to receive a purge gas.

2. The system of claim 1, wherein the plurality of isolation components comprise a plurality of panels.

3. The system of claim 1, wherein the plurality of isolation components each comprises a gasket at a peripheral edge thereof.

4. The system of claim 3, wherein the gasket is comprised of a closed cell foam rubber material.

5. The system of claim 3, wherein the gasket comprises a bulb gasket.

6. The system of claim 1, wherein the plurality of isolation components are comprised of stainless steel, aluminum, carbon steel, chromium or combinations thereof.

7. The system of claim 1, wherein the plurality of isolation components are comprised of polypropylene, polycarbonate, perfluoroalkoxy (PFA), polyvinylchloride (PVC), high density polyethylene (HDPE), low density polyethylene (LDPE), polyvinylidene fluoride (PVDF), partially fluorinated semi-crystalline polymer, a fire retardant polymer, a clean room grade polymer or combinations thereof.

8. The system of claim 1, wherein the plurality of isolation components are configured to attach to the EFEM adjacent the one or more filters.

9. The system of claim 1, wherein at least one of the plurality of isolation components is configured to attach to the EFEM in the return gas flow path.

10. The system of claim 1, further comprising a side storage pod configured to attach to a load port of the EFEM.

* * * * *